United States Patent [19]

Rackman

[11] Patent Number: 5,592,651
[45] Date of Patent: Jan. 7, 1997

[54] METHOD AND SYSTEM FOR LIMITING MULTI-USER PLAY OF VIDEO GAME CARTRIDGES

[76] Inventor: Michael I. Rackman, 1710 Glenwood Rd., Brooklyn, N.Y. 11230

[21] Appl. No.: 370,348

[22] Filed: Jan. 9, 1995

Related U.S. Application Data

[63] Continuation of Ser. No. 75,023, Jun. 11, 1993, abandoned.

[51] Int. Cl.[6] .............................. G06F 7/04; G11B 15/04; G11B 19/04; H04L 9/00
[52] U.S. Cl. .................... 395/490; 340/825.31; 360/60; 380/4
[58] Field of Search .......................... 340/825.31, 825.32, 340/825.34, 825.35; 380/3, 4; 235/380, 375, 382; 360/60; 395/490, 491

[56] References Cited

U.S. PATENT DOCUMENTS

| | | | |
|---|---|---|---|
| 4,577,289 | 3/1986 | Comerford et al. | 360/60 |
| 4,688,169 | 8/1987 | Joshi | 395/725 |
| 4,799,635 | 1/1989 | Nakagawa | 395/425 |
| 4,866,769 | 9/1989 | Karp | 380/4 |
| 5,070,479 | 12/1991 | Nakagawa | 395/575 |
| 5,155,768 | 10/1992 | Matsuhara | 380/23 |

*Primary Examiner*—Donald E. McElheny, Jr.
*Assistant Examiner*—Stephen R. Tkacs
*Attorney, Agent, or Firm*—Gottlieb, Rackman & Reisman, P.C.

[57] ABSTRACT

A system for limiting the number of different video game machines on which a cartridge may be played so as to effectively inhibit the conduct of a cartridge rental business. Every machine has a serial number. Every cartridge records the serial number of any machine on which it is played, up to a maximum number (e.g., ten) of such serial numbers. A machine will not play an inserted cartridge if its serial number is not recorded in the cartridge and if there is no room left to record it.

1 Claim, 3 Drawing Sheets

1

METHOD AND SYSTEM FOR LIMITING MULTI-USER PLAY OF VIDEO GAME CARTRIDGES

This application is a continuation of application Ser. No. 08/075,023, filed Jun. 11, 1993, now abandoned.

BACKGROUND OF THE INVENTION

This invention relates to video games, and more particularly to a method and system for limiting the number of machines on which a compatible video game cartridge or other software medium may be played.

One of the problems faced by manufacturers of video game machines, such as those sold under the trademarks Nintendo and Sega, is that companies which rent videotapes often rent video game cartridges as well. Instead of the manufacturer making multiple sales of cartridges to different persons who desire to play a particular game, fewer sales are made to a "video store" which then rents the cartridges to different customers. It is the video store which realizes the profit on multi-user play of a particular game rather than the machine manufacturer under whose authorization the cartridges are sold in the first place.

Machine manufacturers have developed techniques for preventing the copying of cartridges and even the manufacture of original game cartridges. Nintendo Co., Ltd., for example, provides a microprocessor in each of its cartridges for communicating with a similar microprocessor in each machine. The Nintendo security system requires for its effectiveness that the microprocessor not be duplicated by other manufacturers, and Nintendo has achieved considerable success with this system. The arrangement is described in Nakagawa U.S. Pat. No. 4,799,635 and Nakagawa et al. U.S. Pat. No. 4,865,321. However, while the Nintendo approach prevents the copying of software cartridges and even the distribution of original unauthorized software, it in no way limits the rental of cartridges by a retailer who purchases them in a legitimate way.

SUMMARY OF THE INVENTION

It is a general object of my invention to provide a cost-effective way for a manufacturer, such as a manufacturer of video game machines, to effectively prevent the purchase of software packages (cartridges, etc.) and their rental to owners of the machines.

It is another object of my invention to provide a way to do this which can be applied to new cartridges and new machines, yet allow them to be compatible with a family of cartridges and machines already being marketed, i.e., new machines will play old cartridges and old machines will play new cartridges.

Briefly, in accordance with the principles of my invention, I employ a security chip, comparable to those disclosed in the above-identified Nintendo patents, in both new machines and new cartridges. Each security chip has added to it a small write-once memory. A first memory location in any chip used in a machine has stored in it a serial number assigned to the machine by the manufacturer. The first location of the write-once memory of any chip used in a cartridge serves no purpose. As will become apparent below, it is not necessary that every machine which is manufactured have a unique serial number. It is only necessary that there be a sufficient number of identification codes such that for any relatively large group of renters interested in playing the same cartridge, it is unlikely that together they have a small group of different identification codes in their machines. It is sufficient, for example, that there be as few as 250 different identification codes (serial numbers) for the entire machine population.

When a cartridge is sold, the purchaser is informed that the cartridge may be played on at most ten different machines. (The number ten is arbitrary, and some other number may be selected.) The idea is to select a number of different machines which exceeds the number of different machines on which any cartridge purchased by an ordinary consumer is likely to be played. If a child typically allows a half dozen of his/her friends to play with his/her cartridges, then it is unlikely that that child will be frustrated by not being able to loan his/her cartridges to more than nine friends. It is only a rental store which typically provides a cartridge to more than ten machine owners.

The method of the invention entails storing in the write-once memory of a cartridge security chip the serial numbers of the first ten machines on which the cartridge is played. Thereafter, the cartridge will not play in any machine whose serial number is not contained in the cartridge. Toward this end, ten storage locations are required in the write-once memory of a cartridge security chip. These locations are not used in security chips placed in machines. (While the first memory location is used only in chips included in machines, and the next ten locations are used only in chips included in cartridges, in accordance with the Nintendo approach it is cheaper to provide the same security chip—with the same ROM program—for both cartridges and machines, with a particular chip operating in a machine mode or a cartridge mode depending on a pin connection to the chip.)

The term "new machine" refers to a machine whose security chip includes provision for storing a serial number, as well as the new software (in addition to the present security program) to be described. The term "new cartridge" refers to a cartridge whose security chip includes a number of locations for storing serial numbers of new machines as the cartridge is played on new machines. Consider first the case in which a new cartridge is played on a new machine. At the start of the overall security routine, the machine reads all of the serial numbers already stored in the cartridge. For example, of the ten initially blank locations used to store machine serial numbers, three may already be filled. If the machine does not recognize its own serial number as one of those three, it instructs the security chip in the cartridge to write the machine's serial number in the fourth memory location in the cartridge used to store serial numbers of machines on which the cartridge has already been played. Thereafter, the machine and the cartridge will continue to execute the usual security routine provided by Nintendo to insure that the cartridge is authentic. Similarly, if the machine discovers its own serial number already stored in the cartridge, it simply moves on to the usual security checks without causing the security chip in the cartridge to write the machine's serial number once again. In this latter case, there will still be only three serial numbers stored in the cartridge.

After the cartridge has been played on ten different machines, there will be ten different serial numbers stored in the cartridge. If the cartridge is now played on a machine with an eleventh serial number, when the machine reads ten serial numbers from the cartridge and realizes that its own is not included and that there is no room left to store an eleventh serial number, it will abort or otherwise curtail play of the cartridge.

Ten memory locations are believed to be sufficient because it is unlikely that a particular cartridge will be "shared" by more than ten users. However, it is possible to provide more memory locations if desired. The point is that a video store will certainly rent a cartridge to more than ten different customers. Even if some of the customers have machines with the same serial numbers, a point will soon be reached at which most customers will not be able to play the cartridge on their machines. It will not pay for a video store to purchase cartridges if they can only be rented out to a limited number of customers. (Even if only an 8-bit write-once memory is used, that still allows 256 different serial numbers to be assigned to machines. While there is a good possibility of a few more than ten machine owners having ten or fewer different serial numbers, a video store cannot stay in the cartridge rental business when the majority of its customers will be returning cartridges which cannot play on their machines.)

It should also be noted that it is even possible to sell cartridges at different prices depending upon the number of different machines on which they can be played. For example, an additional memory location might be provided for storing the number of different machines on which a cartridge may be played. One price might be charged for a cartridge which may be played on two machines, and a slightly higher price may be charged for a cartridge which may be played on fifteen machines. The additional memory location in the security chip used in any cartridge would have stored in it at the time of manufacture the number two or fifteen. While every chip used in a cartridge might contain fifteen memory locations for the storage of the maximum number of machine serial numbers, the software in the machine on which the cartridge is played will first read the number which represents the maximum number of authorized machines on which the cartridge may be played and, if it is only two, will allow the writing of only two serial numbers in the write-once memory of the cartridge security chip.

The next case to consider is the play of an old cartridge on a new machine. The old cartridge security chip does not have a write-once memory, and thus it has no facility for storing the serial numbers of machines on which it is played. The software in the new machine first attempts to read all serial numbers stored in a newly inserted cartridge. No such serial numbers can be read from an old cartridge, and the cartridge does not even attempt to respond. In such a case, the machine just ignores this part of the overall security routine—old cartridges can be played on all new machines (as well as all old machines). That is as it should be since old cartridges were sold to the consuming public with no restrictions on the number of machines on which they could be played.

The last case to consider is the play of a new cartridge on an old machine. An old machine does not even attempt to read serial numbers which have been stored in an inserted cartridge. Consequently, the fact that a new cartridge has such serial numbers recorded in it is of no moment. The new security routine check does not even enter the picture.

It is thus apparent that the method of the invention can be implemented on new cartridges and new machines without in any way interfering with the compatibility of old/new cartridges/machines. It should be appreciated, however, that when it is said that new cartridges can be played on only ten different machines, for example, what it means is that a new cartridge can be played only on ten different new machines. That is because if a new cartridge is played on an old machine, the old machine does not even interrogate the new cartridge for recorded serial numbers. Thus a new cartridge will be playable on a total number of machines which is greater than the number promised to the customer. But it is still not economically feasible for a rental store to rent out new cartridges when customer after customer will report that the cartridges do not "work" in his/her machine.

Further objects, features and advantages of the invention will become apparent upon consideration of the following detailed description in conjunction with the drawing, in which:

DESCRIPTION OF THE PREFERRED EMBODIMENTS

The prior art Nintendo security, or authorization, scheme is described not only in U.S. Pat. No. 4,799,635 but also in U.S. Pat. No. 4,865,321, both of which are hereby incorporated by reference. Only a brief summary of the operation of the scheme will be presented herein.

Figure 1:
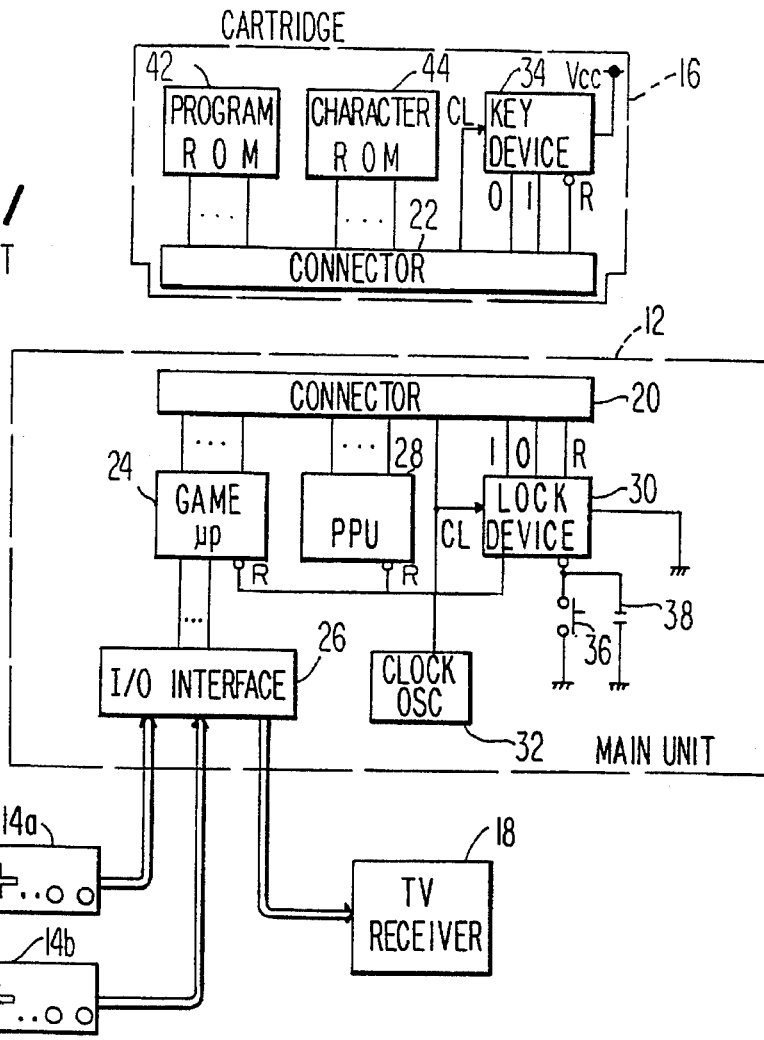
FIG. 1 is the same as FIG. 2 in the above-identified prior art U.S. Pat. No. 4,799,635.

Referring to FIG. 1, an authorized cartridge includes an integrated circuit or chip 34 known as a "key device." Each machine includes a similar chip 30 referred to as a "lock device." The two chips must work together in a synchronized manner, communicating with each other, in order that the machine not be reset or play of the cartridge game otherwise stopped. Protection is afforded as long as unauthorized cartridge manufacturers are unable to manufacture chip 34 or a chip with equivalent timing and functions.

Figure 2:
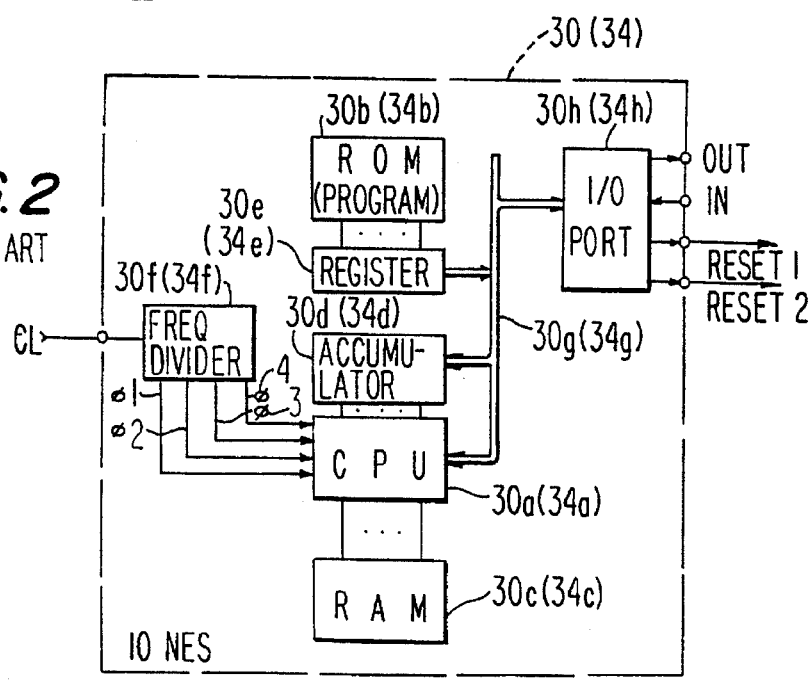
FIG. 2 is the same as FIG. 3 in the same patent.
Figure 3:
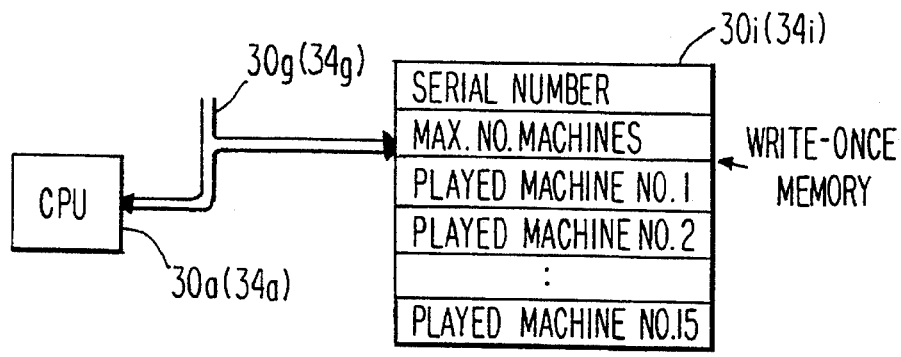
FIG. 3 depicts modifications required to the chip of FIG. 2 in order to implement the present invention.

The security chip itself, shown in FIG. 2, includes a microprocessor with on-board RAM and ROM. It includes a bus $30g$ ($34g$) and an I/O port $30h(34h)$. In accordance with the principles of my invention and as depicted in FIG. 3, the chip must be modified by adding to it a small write-once memory $30i(34i)$ which, in the illustrative embodiment of the invention, has 17 memory locations. Each location need comprise only eight bits. The write-once memory communicates with the system bus $30g(34g)$ in a conventional manner and is addressed as is the other memory (registers, ROM and RAM). Furthermore, ROM $30b(34b)$ in FIG. 2 must include code for executing the program steps illustrated in FIG. 4 and, if desired, the additional steps depicted in FIG. 5.

It is possible to provide longer words in the write-once memory. With a sufficient number of bits in each word, every machine could have its own serial number with no duplications. However, it is not necessary in accordance with the principles of the present invention to do this. All that is required is that there be some group of identifying numbers which is substantially larger than the number of different machines with which any cartridge is likely to be used. In such a case, the cartridge will not be playable on most machines. For example, consider the case of 8-bit words. The first location of the write-once memory, used to store the machine "serial number," is required only for chips used in machines; the location is left blank (00000000) in chips used in cartridges. With 8-bit serial numbers, and if 00000000 is never assigned as a serial number, there are 255 possibilities. If the maximum number of new machines with which any cartridge can ever be played is only 15, the first 15 new machines with different serial numbers on which any cartridge is played will have their serial numbers written into memory locations 3 through 17 in the write-once memory of the cartridge. Thereafter, if an attempt is made to play the cartridge on a new machine which has one of the other 240 serial numbers, the cartridge will not play. The important point to note is that the serial numbers referred to herein are really simply a group of identification codes, which can be relatively small in number (e.g., measured in the hundreds), as long as they provide a way to distinguish one relatively small subset of machines from a substantially larger subset.

Figure 4:
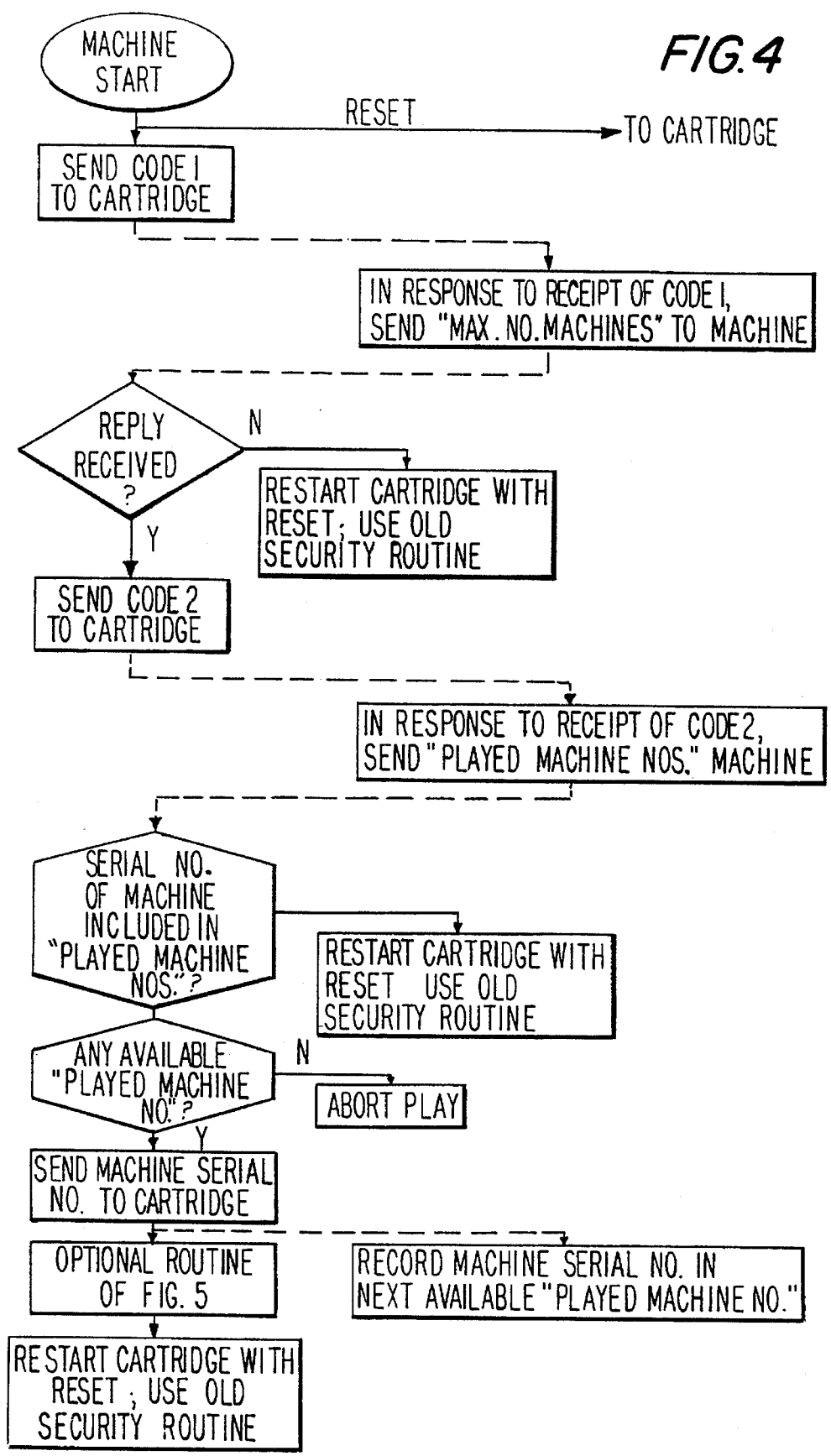
FIG. 4 is a flow chart depicting the methodology of the present invention, which is implemented in software stored in ROM $30b$ or $34b$ in the security chip used in any machine or cartridge.
Figure 5:
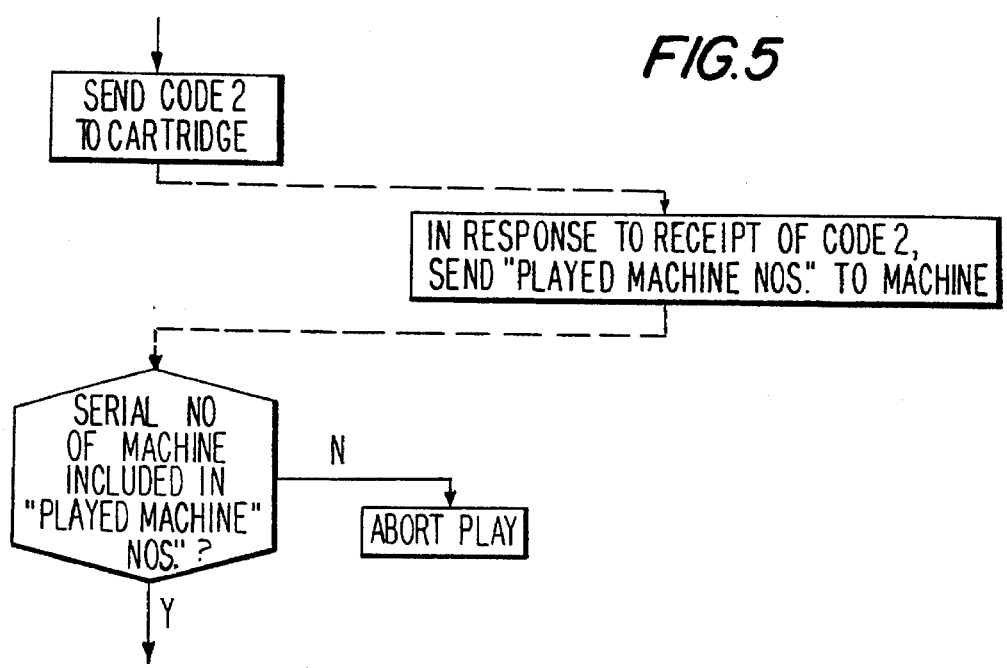
FIG. 5 depicts optional additional steps which may be performed to make it more difficult to foil the system.

Before proceeding with a description of the steps depicted in FIGS. 4 and 5, it should be appreciated that the write-once memories of the chips used in the cartridges and the machines need not be the same. The cartridges require only memory locations 3 through 17—each cartridge must have storage for representing the serial numbers of the first group of "authorized" machines on which the cartridge is played. Since a cartridge is not assigned a serial number as that term is used herein, the first location in a write-once memory of a cartridge is not used. On the other hand, the only data which must be stored in the write-once memory of a machine security chip is its serial number in the first location.

The second memory location, "max. no. machines," represents the maximum number of new machines on which any cartridge can be played. It is not necessary that this memory location be used. For example, if the maximum number of machines on which any cartridge can be played is eight, then that number can be represented in the ROM program which is executed by the machine, as will be described below. In such a case, seven of the "played machine no. ___" locations could also be omitted. Each "played machine No. ___" location is initially blank, but can have written into it the machine number of a machine on which the cartridge was played.) For maximum flexibility, however, the additional memory locations are shown in FIG. 3. This allows the machine manufacturer to provide cartridges which can be played on different numbers of machines. For example, perhaps the standard cartridge could be played on only two different machines, but for a premium price a cartridge might be played on the maximum number of fifteen machines. By providing a variable number in the second location of the write-once memory, to be written by the manufacturer during production, the additional flexibility is possible. Of course, the "max no. machines" location is not required in the chip used in a machine. The only reason for providing all memory locations on all security chips is that the additional cost is negligible and it allows the use of a single part rather than two of them.

It must be borne in mind that prior to the use of any security chip in a cartridge, a number must be stored in the second memory location of the write-once memory if this location is used at all. Similarly, a serial number must be stored in the first location of the write-once memory of any chip used in a machine. Obviously, it is preferable that the 255 possible serial numbers for machines be used with the same frequency so that no group of numbers is favored over another. The system would be self-defeating were most machines to use the same serial number since in such a case any cartridge would be playable on most machines.

Referring to FIG. 4, at the start of the machine sequencing, a reset signal is sent to the cartridge, as described in the two above-identified Nintendo patents. This places the two chips in synchronism. Before the "old" Nintendo security routine is executed (this is the routine described in the two patents), the new program steps controlled by the ROM memory cause the machine to send a data word, represented by "code-1" in the flow chart of FIG. 4, to the cartridge (step 71). Communication between machine and cartridge throughout the drawing is shown by the horizontal dashed lines, with the steps on the left being executed by the machine and those on the right being executed by the cartridge. When the cartridge receives the code1 data word, it interprets it as a command to send its stored "max no. machines" value to the machine. Typically, as described above, the number 2 or 15 would be returned to the machine (step 74). However, this will take place only if the cartridge is a "new" one with the additional software depicted in FIG. 4 as well as the write-once memory. An "old" cartridge will not return a "max no. machines" value. In fact, it will no longer be operating in synchronism with the machine program. However, that is of no moment because the machine immediately performs a test to see whether a reply has been received, i.e., has the number 2 or 15, or some other permissible value, been returned from the cartridge. If such a number has not been returned, then the machine knows that the cartridge is an old one.

Old cartridges will have been sold with no restrictions on the number of machines on which they can be played, and consequently they must be played even on new machines. So after determining that an old cartridge is in the machine (step 73), the machine restarts play of the cartridge with a reset command(step 75). Thereafter, the "old" Nintendo security routine, which is still implemented in the ROM program stored in every "new" security chip, is executed. (The cartridge security chip is restarted only if necessary to place it in synchronism with the machine security chip. Synchronization is required because that is essential to the operation of the Nintendo security routine.)

On the test in step 73 determines that the other hand, if the reply received from the cartridge is a number which represents one of the allowed numbers of machines on which a cartridge may be played, then in step 77 the machine sends another message to the cartridge, this one represented by the term "code 2." In response to the receipt of this message, in step 79 the cartridge, whose security chip is a "new" one since this has already been determined, sends to the machine all of the stored played machine nos. in its write-once memory. Instead of sending all 15 numbers, many of which may still be 00000000, it is possible to transmit only the non-zero numbers, with only one 00000000 code at the end to represent that there are no other stored machine numbers. There are numerous communication schemes for informing the machine of all machine numbers stored in the cartridge.

In step 81, the machine software then reads its own machine serial number from the write-once memory in the machine security chip, and a check is made to see whether this number matches one of the played machine nos. received from the cartridge. If it does, it is an indication that the cartridge has already been played on the machine and that repeat play is authorized. This case is really comparable to that in which an old cartridge is played— the old Nintendo security scheme can be continued. Consequently, in step 83 the cartridge is restarted with a reset as indicated in the flow chart of FIG. 4.

On the other hand, if the serial number of the machine does not match any of those stored in the cartridge, it is an indication that the cartridge has not yet been played on this particular machine. The question now is whether the cartridge has already been played on the maximum number of allowable machines. As indicated in the flow chart, in step 85 a test is performed to see whether there is yet an available played machine no. location in the write-once memory of the cartridge in which a machine serial number has not been written. Since the cartridge has transmitted to the machine the serial numbers of all machines on which the cartridge has already been played, and the machine knows the maximum number of allowed machines, a simple subtraction operation yields an answer to the question whether the cartridge can be played on the particular machine in question. If the maximum number of serial numbers have already been stored in the write-once memory of the cartridge, in step 87 play of the cartridge is aborted as indicated in FIG. 4.

On the other hand, if there is still "room" on the cartridge for another played machine serial number to be written, in step 89 the machine sends its own serial number to the cartridge. As indicated in FIG. 4, in step 92 the cartridge software then records the received machine serial number in the next available "played machine number" location in the write-once memory. One more cartridge memory location is now used, and the machine on which the cartridge is now being played will thereafter be authorized to play the cartridge.

The machine may then execute the optional routine of FIG. 5 if it is provided, as shown in step 91. Thereafter, as shown in step 93, normal play of the cartridge ensues. To insure that the two security chips operate in synchronism, the machine controls restart of the cartridge security chip software with a reset command, after which the old Nintendo security routine is executed.

The optional routine of FIG. 5 is simply a safety check. In the event an attempt is made to foil the security system of the invention, an additional security check is provided in FIG. 5. In step 95, the machine sends the "code-2" message to the cartridge, in response to which—as previously depicted in FIG. 4—the cartridge sends to the machine all stored played machine numbers, shown in step 97 in FIG. 5. This time the newly recorded serial number of the machine should be included in the group. The machine checks in step 98 to see whether its own serial number is included in those sent by the cartridge. If it is, then the cartridge is restarted with a reset, the old security routine is executed and the game is played. But if the serial number of the machine is not received back from the cartridge, play is aborted in step 99. This additional sequencing provides an added measure of security because while a video/cartridge store owner may attempt to foil the system, it is very difficult to "fix" the cartridge so that it sends back to the machine the serial number of the machine. It is for this same reason of making it difficult to foil the system that the major processing, e.g., comparing the machine serial number with those stored in the cartridge, is performed in the machine rather than the cartridge—there is less opportunity to foil the protection mechanism.

Although the invention has been described with reference to a particular embodiment, it is to be understood that this embodiment is merely illustrative of the application of the principles of the invention. For example, although disclosed in the context of the Nintendo security system, the subject invention can be used on its own without employing the Nintendo or other equivalent security scheme at all. Or it could be incorporated in tape players and compatible tape cartridges, with machine identification codes being written on a reserved portion of the tape in any cartridge. Similar remarks apply to disc players and discs. Instead of using a write-once memory in the cartridge, a non-volatile memory, whose data can be overwritten, might be used. However, in such a case, to prevent clearing of the stored identification codes by a business establishment in the cartridge rental business, all writing (including clearing) should be under control of a pair of security chips so that, as long as the security chip is not duplicated by an unauthorized source, identification code overwriting will not be possible. Thus it is to be understood that numerous modifications may be made in the illustrative embodiment of the invention and other arrangements may be devised without departing from the spirit and scope of the invention.

What I claim is:

1. A method for limiting the number of different machines on which a compatible software medium may be played, said software medium and each of said machines transferring information therebetween, comprising the steps of associating with each machine one of a number of different machine identification codes, providing for storage in said software medium of up to at least ten machine identification codes associated with machines on which said software medium has been played, said number of different machine identification codes being substantially larger than the number of machine identification codes for which storage is provided in said software medium, storing in said software medium the identification code of any machine on which said software medium is played if said identification code is not already stored in said software medium and there is storage available in said software medium for at least one more machine identification code, and aborting play of said software medium by a machine if the identification code of the machine is not stored in the software medium and there is no more storage available for identification codes in said software medium.

\* \* \* \* \*